(12) United States Patent
Lee

(10) Patent No.: US 11,869,226 B2
(45) Date of Patent: Jan. 9, 2024

(54) COMPUTER READABLE RECORDING MEDIUM WHICH CAN PERFORM IMAGE PATTERN DETERMINING METHOD

(71) Applicant: PixArt Imaging Inc., Hsin-Chu (TW)

(72) Inventor: Joon Chok Lee, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 443 days.

(21) Appl. No.: 17/079,512

(22) Filed: Oct. 25, 2020

(65) Prior Publication Data

US 2022/0129692 A1  Apr. 28, 2022

(51) Int. Cl.
*G06V 10/50* (2022.01)
*G06V 10/44* (2022.01)

(52) U.S. Cl.
CPC ............ *G06V 10/50* (2022.01); *G06V 10/443* (2022.01)

(58) Field of Classification Search
CPC ..... G06V 10/443; G06V 10/50; G06V 10/225
See application file for complete search history.

(56) References Cited

U.S. PATENT DOCUMENTS

| | | | | |
|---|---|---|---|---|
| 5,909,242 A * | 6/1999 | Kobayashi | ......... | H04N 23/6815 348/207.99 |
| 6,510,240 B1 * | 1/2003 | Koduri | .................. | G06T 7/0008 382/146 |
| 8,194,927 B2 * | 6/2012 | Zhang | .................. | G06V 20/588 382/104 |
| 9,123,140 B1 * | 9/2015 | Liu | ........................ | G06T 3/4053 |
| 10,777,155 B1 * | 9/2020 | Chuang | ................. | G09G 3/3614 |
| 10,821,762 B2 * | 11/2020 | Hohberger | ................ | B41M 5/48 |
| 11,226,261 B2 * | 1/2022 | Lobachinsky | .......... | G01M 11/35 |
| 2007/0003256 A1 * | 1/2007 | Mochizuki | ............... | H04N 5/94 386/271 |
| 2009/0028399 A1 * | 1/2009 | Krishnan | ................. | G06T 15/08 382/128 |
| 2009/0115870 A1 * | 5/2009 | Sasaki | ................... | H04N 23/843 382/300 |
| 2009/0304270 A1 * | 12/2009 | Bhagavathy | ........... | H04N 1/409 382/162 |
| 2010/0134516 A1 * | 6/2010 | Cooper | .................... | G06T 15/04 345/592 |
| 2011/0274169 A1 * | 11/2011 | Paz | ......................... | H04N 19/14 375/E7.255 |
| 2011/0304588 A1 * | 12/2011 | Tsai | ...................... | G06F 3/0428 345/175 |

(Continued)

*Primary Examiner* — Xuemei G Chen
(74) *Attorney, Agent, or Firm* — Winston Hsu

(57) ABSTRACT

A computer readable recording medium storing at least one program, wherein an image pattern determining method for determining a stripe image can be performed when the program is executed. The image pattern determining method comprises: (a) classifying a single target image to a plurality of image blocks, wherein each of the image blocks comprises at least one pixel; (b) calculating pixel differences between pixel value sums of at least one of the image blocks and neighboring image blocks of the image block; (c) calculating image variation levels of each of the image blocks in a plurality of directions according to the pixel differences; and (d) determining whether the single target image comprises the strip image or not according to the image variation levels. An image pattern determining method for determining a check board image is also disclosed.

13 Claims, 8 Drawing Sheets

(56) References Cited

U.S. PATENT DOCUMENTS

| | | | |
|---|---|---|---|
| 2014/0328527 A1* | 11/2014 | Zhou | G06T 7/149 |
| | | | 382/131 |
| 2014/0375815 A1* | 12/2014 | Kanou | H04N 23/71 |
| | | | 348/148 |
| 2015/0154939 A1* | 6/2015 | Zhan | G09G 3/006 |
| | | | 345/589 |
| 2016/0148377 A1* | 5/2016 | Xu | G06V 10/50 |
| | | | 382/128 |
| 2017/0337432 A1* | 11/2017 | Maeda | G06V 20/588 |
| 2017/0337433 A1* | 11/2017 | Guo | G06V 10/421 |
| 2018/0350057 A1* | 12/2018 | Inoue | G03F 1/84 |
| 2019/0073754 A1* | 3/2019 | Chen | G06T 5/50 |
| 2019/0240540 A1* | 8/2019 | Wei | A63B 22/0235 |
| 2020/0036949 A1* | 1/2020 | Tu | H04N 9/3185 |
| 2020/0117919 A1* | 4/2020 | Tohriyama | G06V 20/588 |
| 2020/0142067 A1* | 5/2020 | Wang | G01S 17/931 |
| 2021/0174547 A1* | 6/2021 | Park | G08G 5/003 |

\* cited by examiner

COMPUTER READABLE RECORDING MEDIUM WHICH CAN PERFORM IMAGE PATTERN DETERMINING METHOD

BACKGROUND OF THE INVENTION

1. Field of the Invention

The present invention relates to a computer readable recording medium which can perform an image pattern determining method, and particularly relates to a computer readable recording medium which can perform an image pattern determining method for determining a stripe image or a check board image.

2. Description of the Prior Art

Repetitive pattern such as a check board and stripes are challenging surfaces for optical navigation system due to the existence of multiple cross-correlation peaks.

If the wrong cross-correlation peak is chosen, the optical navigation system will report incorrect movement, either wrong direction or wrong magnitude or combination of both. For example, if such issue occurs to a drone comprising an optical sensor which is used for stationary hover, this may result in drone over compensating actual movement and deviate from the target hovering position.

Therefore, a proper image pattern determining method is needed.

SUMMARY OF THE INVENTION

One objective of the present invention is to provide an image pattern determining method for determining a stripe image.

Another objective of the present invention is to provide an image pattern determining method for determining a check board image.

One embodiment of the present invention discloses a computer readable recording medium storing at least one program, wherein an image pattern determining method for determining a stripe image can be performed when the program is executed. The image pattern determining method comprises: (a) classifying a single target image to a plurality of image blocks, wherein each of the image blocks comprises at least one pixel; (b) calculating pixel differences between pixel value sums of at least one of the image blocks and neighboring image blocks of the image block; (c) calculating image variation levels of each of the image blocks in a plurality of directions according to the pixel differences; and (d) determining whether the single target image comprises the strip image or not according to the image variation levels.

Another embodiment of the present invention discloses a computer readable recording medium storing at least one program, wherein an image pattern determining method for determining a check board image can be performed when the program is executed. The image pattern determining method comprise: (a) calculating first pixel differences between at least one of the pixels of a single target image and neighboring pixels of the pixel; (b) calculating image variation levels of each of the pixels in a plurality of directions according to the first pixel differences; and (c) determining whether the single target image comprises the check board image or not according to the image variation levels.

In view of above-mentioned embodiments, the images which may cause interferences to the optical navigation device can be determined, to avoid the issues of prior art.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Besides, the term "first", "second", "third" in following descriptions are only for the purpose of distinguishing different one elements, and do not mean the sequence of the elements. For example, a first device and a second device only mean these devices can have the same structure but are different devices.

Figure 1:
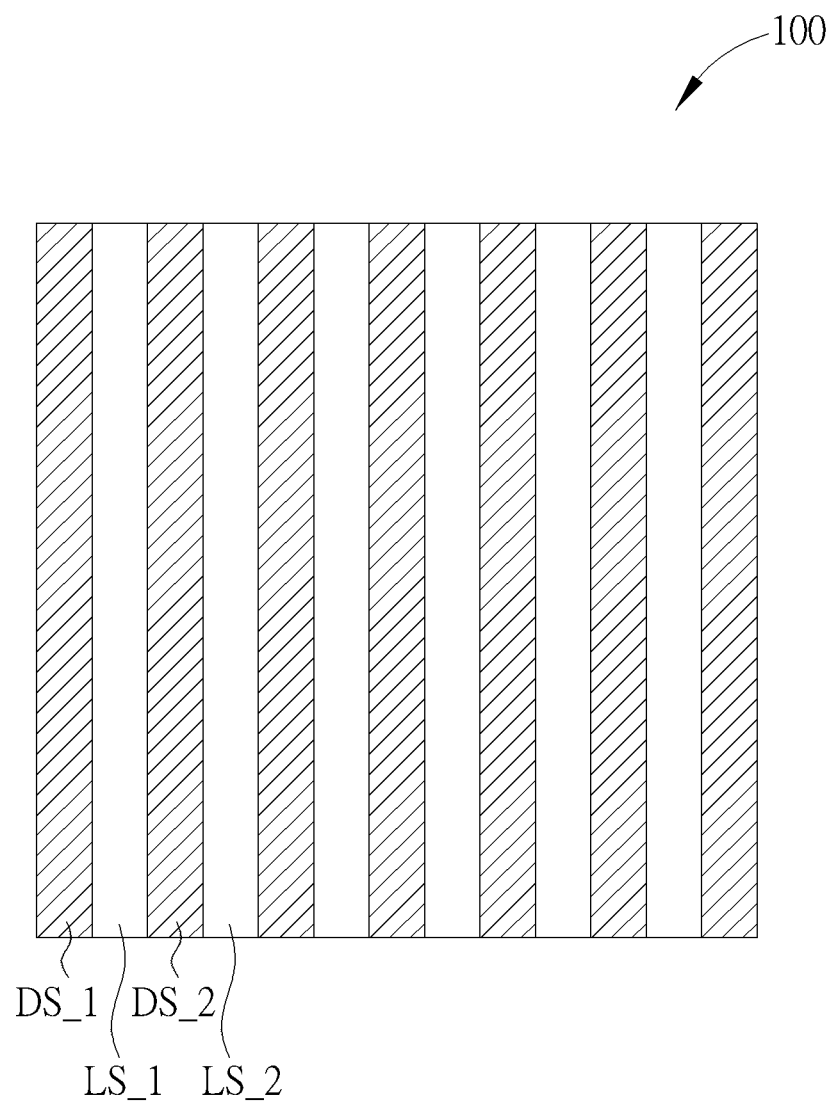
FIG. 1 is a schematic diagram illustrating an example of the stripe image.

FIG. 1 is a schematic diagram illustrating an example of the stripe image 100. As shown in FIG. 1, the stripe image 100 comprises dark color stripe images DS_1, DS_2 . . . and light color stripe images LS_1, LS_2 . . . (only two of the dark color stripe images and two of the light color stripe images are marked). The dark color stripe images and the light color stripe images alternately appear. Please note, the image pattern determining method provided by the present invention is not limited to be applied to the stripe image comprising dark color stripe images and light color stripe images. The image pattern determining method provided by the present invention can be applied to a stripe image comprising two or more kinds of strip images which have color differences.

Figure 2:
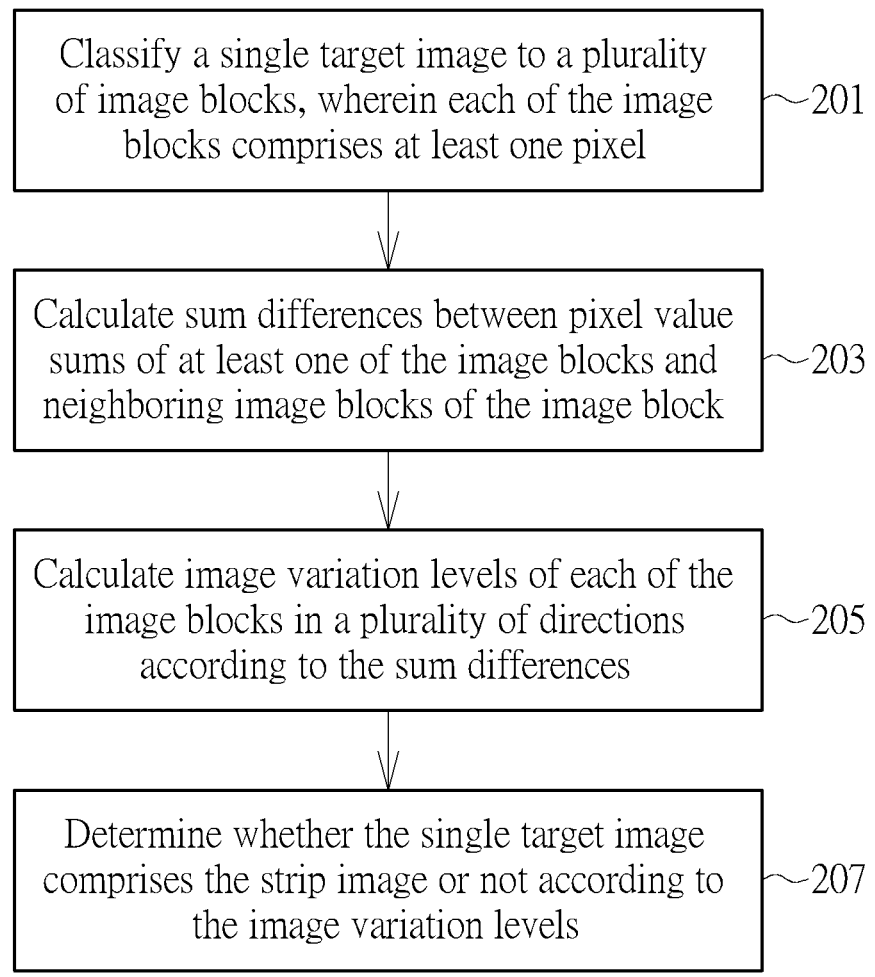
FIG. 2 is a flow chart illustrating an image pattern determining method for determining a stripe image according to one embodiment of the present invention.

FIG. 2 is a flow chart illustrating an image pattern determining method for determining a stripe image according to one embodiment of the present invention. The flow chart in FIG. 2 comprises following steps:

Step 201

Classify a single target image to a plurality of image blocks, wherein each of the image blocks comprises at least one pixel. The image block can comprise one or more than one pixels.

Step 203

Calculate sum differences between pixel value sums of at least one of the image blocks and neighboring image blocks of the image block. If the image block comprises only one pixel, the step 203 can be changed to "Calculate differences between pixel values of at least one of the pixels and neighboring pixels of the pixel".

Step 205

Calculate image variation levels of each of the image blocks in a plurality of directions according to the sum differences.

Step 207

Determine whether the single target image comprises the strip image or not according to the image variation levels.

Figure 3:
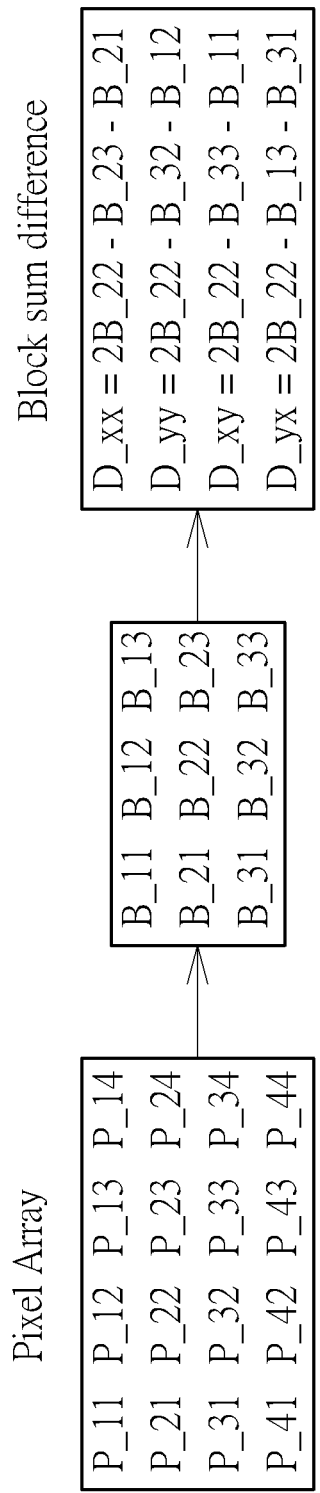
FIG. 3 is a schematic diagram illustrating an example of the steps 201-205 in FIG. 2, according to one embodiment of the present invention.

Many methods can be applied to implement the steps illustrated in FIG. 2. FIG. 3 is a schematic diagram illustrating an example of the steps 201-203 in FIG. 2, according to one embodiment of the present invention. As illustrated in FIG. 3, the pixel array is comprised in a single target image, which can be equal or larger than the pixel array. Also, the pixels P_11, P_12 . . . P_44 in the pixel array are classified into a plurality of blocks B_11, B_12 . . . B_33 (step 201).

In one embodiment, the pixel value sums of image blocks BS_11, BS_12 . . . BS_33 are as follows:

$$BS\_11 = PV\_11 + PV\_12 + PV\_21 + PV\_22$$

$$BS\_12 = PV\_12 + PV\_13 + PV\_22 + PV\_23$$

$$BS\_13 = PV\_13 + PV\_14 + PV\_23 + PV\_24$$

$$BS\_21 = PV\_21 + PV\_22 + PV\_31 + PV\_32$$

$$BS\_22 = PV\_22 + PV\_23 + PV\_32 + PV\_33$$

$$BS\_23 = PV\_23 + PV\_24 + PV\_33 + PV\_34$$

$$BS\_31 = PV\_31 + PV\_32 + PV\_41 + PV\_42$$

$$BS\_32 = PV\_32 + PV\_33 + PV\_42 + PV\_43$$

$$BS\_33 = PV\_33 + PV\_34 + PV\_43 + PV\_44$$

The symbols PV_11, PV_12 . . . PV_44 respectively means the pixel values of the pixels P_11, P_12 . . . P_44.

After that, sum differences between pixel value sums BS_11, BS_12 . . . BS_33 of at least two of the image blocks B_11, B_12 . . . B_33 in a plurality of directions are calculated (step 203). Such sum differences can mean the image variation levels. As illustrated in FIG. 3, the sum differences D_xx, D_yy, D_xy and D_yx are respectively as follows:

$$D\_xx = 2BS\_22 - BS\_23 - BS\_21$$

$$D\_yy = 2BS\_22 - BS\_32 - BS\_12$$

$$D\_xy = 2BS\_22 - BS\_33 - BS\_11$$

$$D\_yx = 2BS\_22 - BS\_13 - BS\_31$$

That is, in the embodiment of FIG. 3, the step 203 calculates the sum differences between at least one of the image blocks and the neighboring image blocks in a vertical direction (D_yy), a horizontal direction (D_xx), a bottom left to top right direction (D_yx) and a bottom right to top left direction (D_xy).

In one embodiment, the step 205 comprises computing numbers of the image blocks which has a smaller image variation level in some directions, and computing numbers of the image blocks which has a larger image variation level in some directions. Specifically, in one embodiment, the step 205 computes a first number of the image blocks which has a small image variation level in a first specific direction, computes a second number of the image blocks which has a large image variation level in a second specific direction. The small image variation level here may mean the image variation level is smaller than a threshold level, and the large image variation level here may mean the image variation level is larger than the threshold level.

After that, the step 207 determines whether the single target image comprises the strip image or not according to the first number and the second number. Since the strip image has larger image variations between the dark strip image and the light strip image, thus the image variation levels may be smaller in some directions but be larger in other directions. Take the strip image 100 in FIG. 1 for example, the strip image 100 has smaller image variation levels in the vertical direction and has larger image variation levels in the horizontal direction. Therefore, the step 207 can determine whether the single target image comprises the strip image or not according to the image variation levels based on the image variation levels acquired in the step 205.

In one embodiment, the sum differences D_xx, D_yy, D_xy and D_yx are further classified into more groups based on locations thereof. In such case, the step 207 determines whether the single target image comprises the strip image or not according to corresponding sum differences in different groups. For example, the sum differences D_xx, D_yy, D_xy and D_yx are classified into four quadrants according to locations of corresponding pixels. After that, the step 207 determines whether the sum difference D_xx in each quadrant meets the strip image condition (e.g. whether all the sum differences D_xx are small in all quadrants). Also, the step 207 determines whether the sum differences D_xy, D_yy, D_yx in each quadrant meets the strip image condition following the same way. In such case, the step 207 determines whether the single target image comprises the strip image or not only when the sum differences D_xx, D_xy, D_yy, D_yx meets the strip image condition.

The thresholds for determining whether the image variation level is large or small (i.e. the threshold level) may be determined by the pixel array size (i.e. the total number of pixels) and sensitivity level of detection, where lower threshold translates to higher sensitivity and vice versa. Furthermore, the image pattern determining method provided by the present invention is not limited to apply four sum differences D_xx, D_yy, D_xy and D_yx. The number or type of sum differences can change corresponding to different directions of stripe images. For example, only the sum difference D_xx is required if only the stripe images in vertical direction (as shown in FIG. 1) need to be detected. In another example, only the sum difference D_yy is required if only the stripe images in horizontal direction need to be detected. In another example, only the sum differences D_xy and D_yx are required if only the stripe images in diagonal direction need to be detected.

Besides the strip image, the image pattern determining method can further be provided to determine other images.

In following descriptions, an image pattern determining method which can be used to determine a check board image is described.

Figure 4:
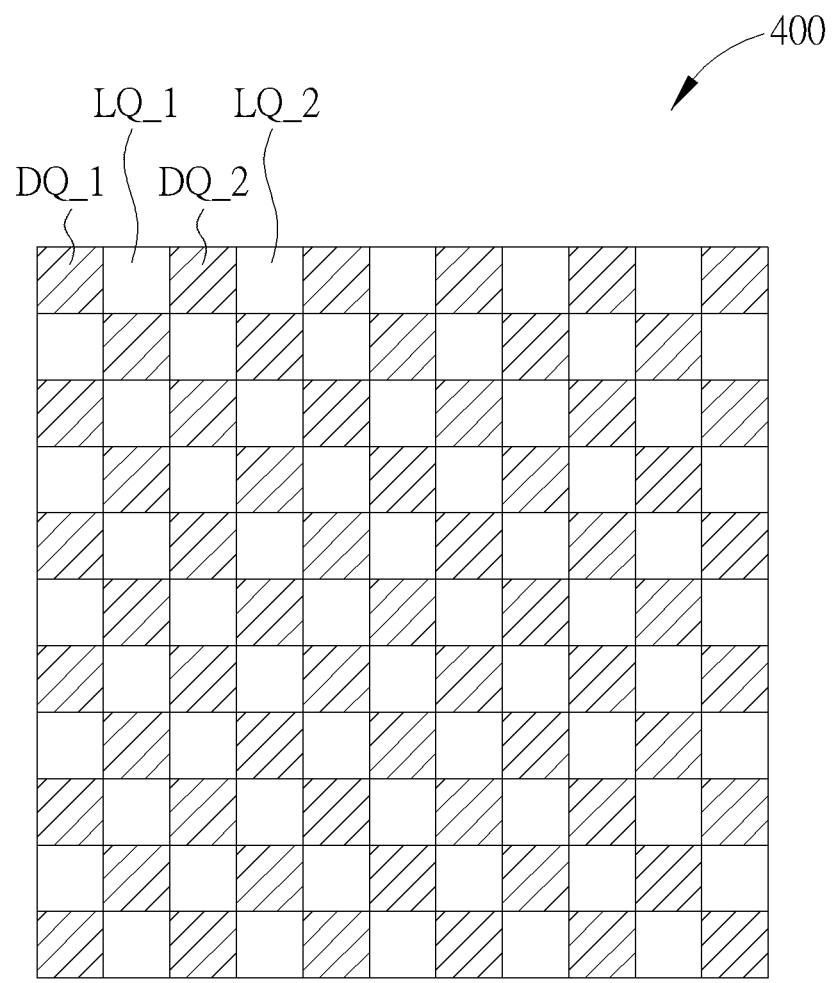
FIG. 4 is a schematic diagram illustrating an example of the check board image.

FIG. 4 is a schematic diagram illustrating an example of the check board image 400. As shown in FIG. 4, the check board image 400 comprises dark color square images DQ_1, DQ_2 . . . and light color square images LQ_1, LQ_2 . . . (only two of the dark color square images and two of the light color square images are marked). The dark color square images and the light color square images alternately appear, in the vertical direction and in the horizontal direction. Please note, the image pattern determining method provided by the present invention is not limited to be applied to the check board image comprising dark color square images and light color square images. The image pattern determining method provided by the present invention can be applied to a square image comprising two or more kinds of square images which have color differences.

Figure 5:
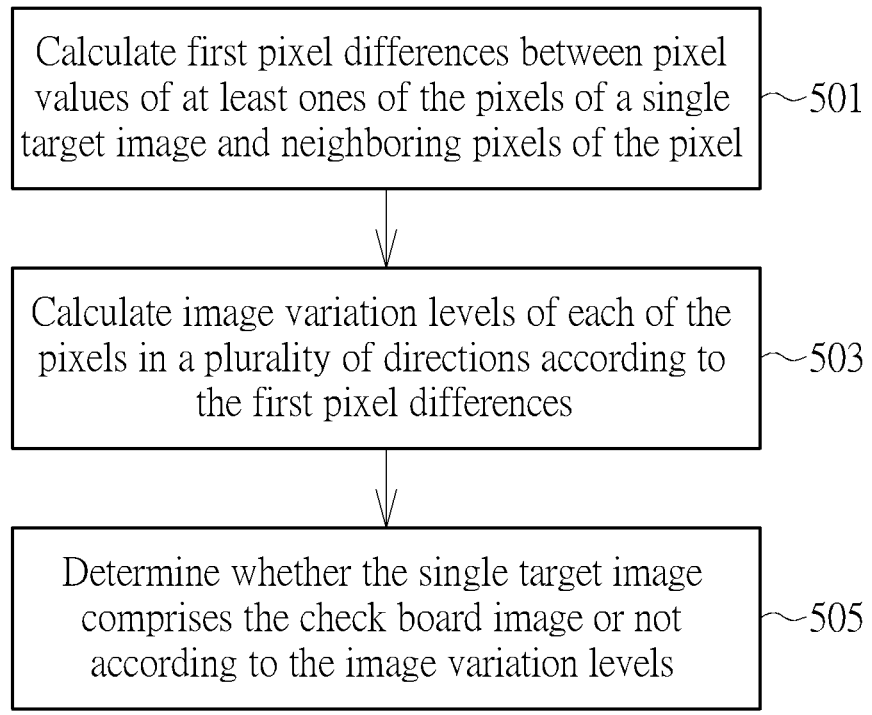
FIG. 5 is a flow chart illustrating an image pattern determining method for determining a check board image according to one embodiment of the present invention.

FIG. 5 is a flow chart illustrating an image pattern determining method for determining a square image according to one embodiment of the present invention. The flow chart in FIG. 5 comprises following steps:

Step 501

Calculate first pixel differences between pixel values of at least ones of the pixels of a single target image and neighboring pixels of the pixel.

Step 503

Calculate image variation levels of each of the pixels in a plurality of directions according to the first pixel differences Step 505

Determine whether the single target image comprises the check board image or not according to the image variation levels.

Figure 6:
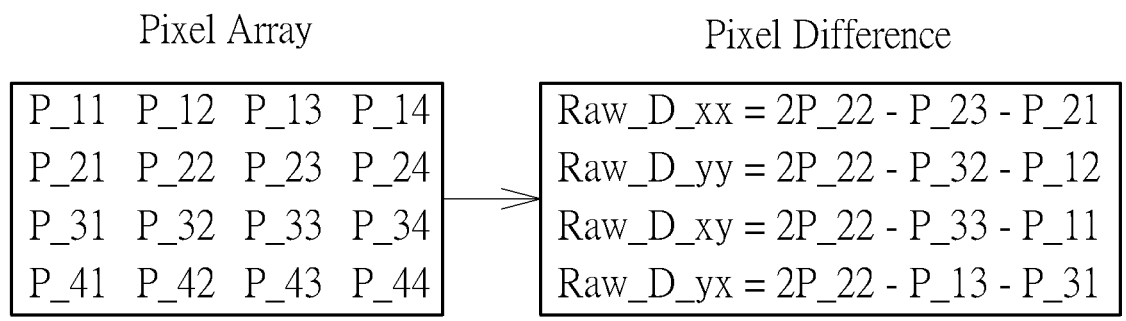
FIG. 6 is a schematic diagram illustrating an example of the step 501 in FIG. 5, according to one embodiment of the present invention.

Many methods can be applied to implement the steps illustrated in FIG. 5. FIG. 6 is a schematic diagram illustrating an example of the steps 501 in FIG. 5, according to one embodiment of the present invention. As illustrated in FIG. 6, the pixel array is comprised in a single target image, which can be equal or larger than the pixel array. Also, the pixel differences Raw D_xx, Raw D_yy, Raw D_xy, Raw D_yx are computed as follows:

$$\text{Raw } D\_xx = 2P\_22 - P\_23 - P\_21$$

$$\text{Raw } D\_yy = 2P\_22 - P\_32 - P\_12$$

$$\text{Raw } D\_xy = 2P\_22 - P\_33 - P\_11$$

$$\text{Raw } D\_yx = 2P\_22 - P\_13 - P\_31$$

That is, the step 501 in FIG. 5 computes the first pixel differences in a vertical direction, a horizontal direction, a bottom left to top right direction and a bottom right to top left direction.

In one embodiment, the step 503 comprises computing numbers of the pixels which has a smaller image variation level in some directions, and computing numbers of the pixels which has a larger image variation level in some directions. Specifically, in one embodiment, the step 503 computes a first number of the pixels which has a small image variation level in a first specific direction, computes a second number of the pixels which has a large image variation level in a second specific direction. The small image variation level here may mean the image variation level is smaller than a threshold level, and the large image variation level here may mean the image variation level is larger than the threshold level. After that, the 505 determines whether the single target image comprises the check board image or not according to a sum of the first number and the second number. Since the dark color square image and the light color square image alternately appears in the check board image, thus the check board image may have large image variation images in many directions or in all directions, thus such method can be applied to determine the check board image.

In one embodiment, besides the first number and the second number, the step 503 further comprise computing numbers of the image blocks which has a smaller image variation level in some directions, and computing numbers of the image blocks which has a larger image variation level in some directions. The step 505 further determines whether the single target image comprises the check board image or not according to the first number, the second number, and the above-mentioned numbers of the image blocks.

For more detail, in one embodiment, the step 503 comprises: classifying the single target image to a plurality of image blocks, wherein each of the image blocks comprises more than one of the pixels; calculating second pixel differences between at least one of the image blocks and neighboring image blocks of the image block; computing a third number of the image blocks which has a small image variation level in the first specific direction; computing a fourth number of the image blocks which has a large image variation level in the second specific direction. These steps are similar with some steps of determining the stripe image, which are described in above-mentioned descriptions.

After that, the step 505 determines whether the single target image comprises the check board image or not according to the first number, the second number, the third number and the fourth number. Specifically, in one embodiment, the step 505 determines whether the single target image comprises the check board image or not according to a difference between the first number and the third number, and a difference between the second number and the fourth number. The advantage of such step is: since the check board image has dark color squares and light color squares alternately appear, differences between pixel values of pixels and differences between pixel value sums of image blocks may be different. Therefore, such steps can help determine the check board image.

In one embodiment, the step 505 further computes correlations for pixels in one image block, and accordingly determines whether the single target image comprises the check board image or not. The step 505 may determine whether the single target image comprises the check board image or not according to a difference of the correlations of the pixels at different locations. The advantage of such step is: since the check board image has dark color squares and light color squares alternately appear, correlations for pixels at different locations in the image block with other pixels may be different. Therefore, such steps can help determine the check board image.

The thresholds for determining whether the image variation level is large or small (i.e. the threshold level) may be determined by the pixel array size (i.e. the total number of pixels) and sensitivity level of detection, where lower threshold translates to higher sensitivity and vice versa. Additionally, the embodiments illustrated in FIG. 5 and FIG. 6 can be performed to any image comprises repeated pattern with different colors rather than limited to a check board image. For example, the embodiments illustrated in FIG. 5 and FIG. 6 can be performed to determine an image comprises repeated triangles or circles having different colors.

Please note, the above-mentioned single target image means only one image, thus the image pattern determining method can determine the strip image and the check board image according to only one image, rather than according to a plurality of images.

Figure 7:
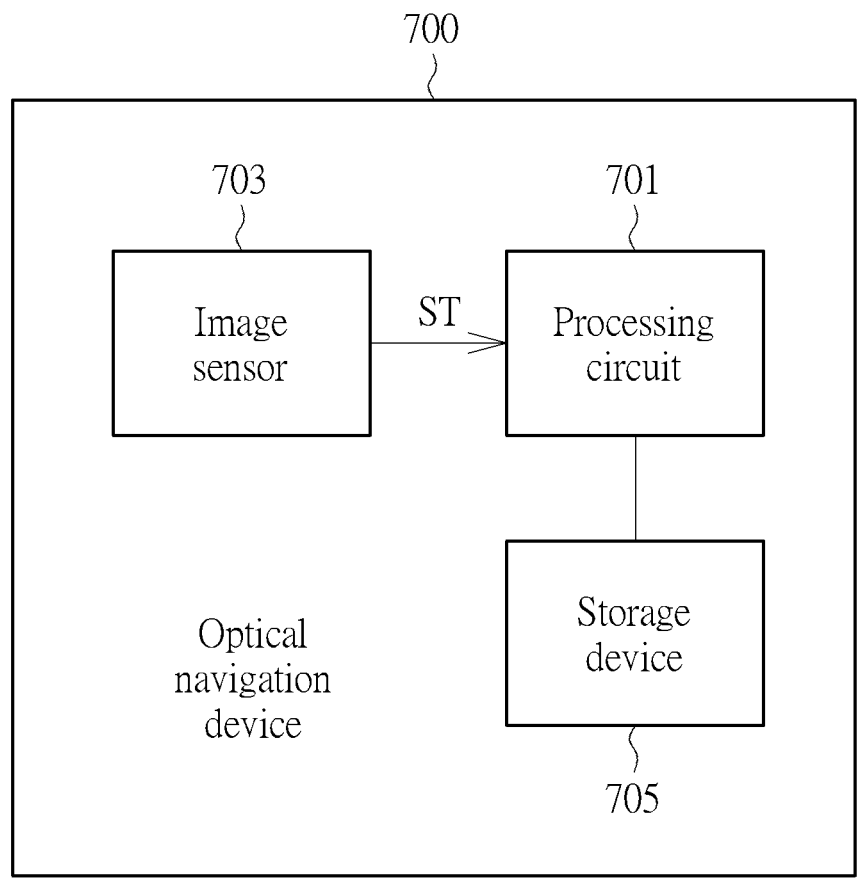
FIG. 7 is a block diagram illustrating an optical navigation device according to one embodiment of the present invention.

FIG. 7 is a block diagram illustrating an optical navigation device according to one embodiment of the present invention. As shown in FIG. 7, the optical navigation device 700 comprises a processing circuit 701, an image sensor 703, and a storage device 705. The image sensor 703 is configured to capture the above-mentioned single target image ST, and the processing circuit 701 is configured to determine whether the single target image ST comprises the strip image and the check board image via above-mentioned steps, by executing at least one program stored in the storage device 705.

Figure 8:
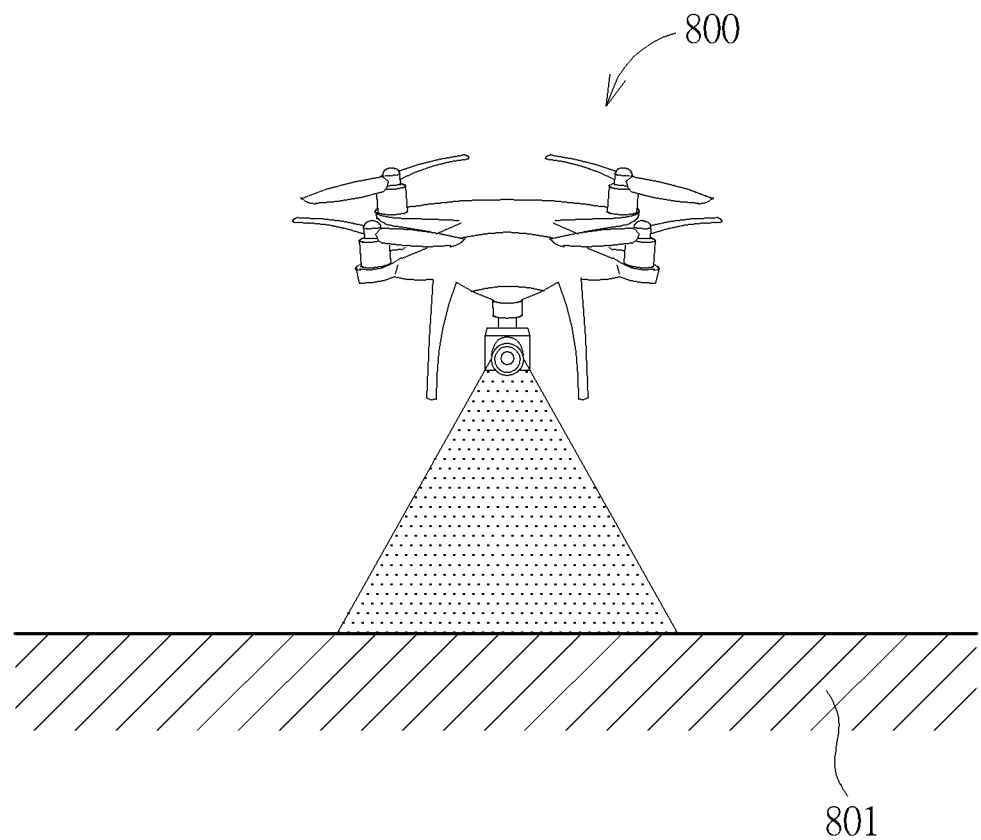
FIG. 8 is a schematic diagram illustrating that the image pattern determining method is applied to a drone.

The optical navigation device 700 may be any kind of device. In the embodiment of FIG. 8, a drone 800 is applied to implement the optical navigation device 700. As illustrated in FIG. 8, the drone 800 is moving in the sky. The image sensor therein continuously captures a plurality of single target images of the surface 801 (e.g. a ground or a desk), and the processing circuit therein respectively determines whether each of the single target image comprises the stripe image or the check board image. That is, the processing circuit in the drone 800 determines whether the surface 801 contains stripe patterns or check board patterns.

The drone 800 can be controlled according to whether the stripe patterns or check board patterns exist (i.e. whether the single target image comprises the stripe image or the check board image). If no stripe patterns or check board patterns exists on the surface 801, the drone 800 may not be interfered thus keeps normal actions. If the surface 801 contains stripe patterns or check board patterns, the drone 800 may activate a compensation mechanism to help the movement thereof. For example, the drone 800 may pass by the region having stripe patterns or check board patterns, or uses other devices such as a gyroscope to help the movement thereof.

In view of above-mentioned embodiments, the images which may cause interferences to the optical navigation device can be determined, to avoid the issues of prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image pattern determining method, comprising:
   (a) classifying a single target image to a plurality of image blocks, wherein each of the image blocks comprises at least one pixel;
   (b) calculating pixel differences between pixel value sums of at least one of the image blocks and neighboring image blocks of the image block;
   (c) calculating image variation levels of each of the image blocks in a plurality of directions according to the pixel differences; and
   (d) determining whether the single target image comprises a strip image or not according to the image variation levels;
   wherein the step (d) determines whether the single target image comprises the strip image or not according to numbers of the image blocks which have different image variation levels in different specific directions.

2. The image pattern determining method of claim 1, wherein the image blocks comprises only one pixel.

3. The image pattern determining method of claim 1, wherein the image blocks comprises more than one pixel.

4. The image pattern determining method of claim 1, wherein the step (b) computes the pixel differences between at least one of the image blocks and the neighboring image blocks in at least one of: a vertical direction, a horizontal direction, a bottom left to top right direction and a bottom right to top left direction.

5. The image pattern determining method of claim 1, wherein the step (c) comprises:
   computing a first number of the image blocks which has a small image variation level in a first specific direction;
   computing a second number of the image blocks which has a large image variation level in a second specific direction;
   wherein the step (d) determining whether the single target image comprises the strip image or not according to the first number and the second number.

6. An image pattern determining method, comprising:
   (a) calculating first pixel differences between at least one of the pixels of a single target image and neighboring pixels of the pixel;
   (b) calculating image variation levels of each of the pixels in a plurality of directions according to the first pixel differences; and
   (c) determining whether the single target image comprises a check board image or not according to the image variation levels;
   wherein the step (c) determines whether the single target image comprises the check board image or not according to numbers of the pixels which have different image variation levels in different specific directions.

7. The image pattern determining method of claim 6, wherein the step (a) computes the first pixel differences in a vertical direction, a horizontal direction, a bottom left to top right direction and a bottom right to top left direction.

8. The image pattern determining method of claim 6, wherein the step (b) comprises:
   computing a first number of the pixels which has a small image variation level in a first specific direction;
   computing a second number of the pixels which has a larger image variation level in a second specific direction;
   wherein the step (c) determines whether the single target image comprises the check board image or not according to the first number and the second number.

9. The image pattern determining method of claim 8, wherein the step (c) determines whether the single target image comprises the check board image or not according to a sum of the first number and the second number.

10. The image pattern determining method of claim 8, wherein the image pattern determining method comprises:
    classifying the single target image to a plurality of image blocks, wherein each of the image blocks comprises more than one of the pixels;
    calculating second pixel differences between at least one of the image blocks and neighboring image blocks of the image block;
    computing a third number of the image blocks which has a small image variation level in the first specific direction;
    computing a fourth number of the image blocks which has a large image variation level in the second specific direction;
    wherein the step (c) determines whether the single target image comprises the check board image or not according to the first number, the second number, the third number and the fourth number.

11. The image pattern determining method of claim 10, wherein the step (c) determines whether the single target image comprises the check board image or not according to a difference between the first number and the third number, and a difference between the second number and the fourth number.

12. The image pattern determining method of claim 10, wherein the image pattern determining method comprises:
calculating correlations of the pixels in at least one of the image block;
wherein the step (c) further determines whether the single target image comprises the check board image or not according to the correlations.

13. The image pattern determining method of claim 12, wherein the step (c) further determines whether the single target image comprises the check board image or not according to a difference of the correlations of the pixels at different locations.

* * * * *